United States Patent
Li et al.

(10) Patent No.: US 11,536,944 B2
(45) Date of Patent: Dec. 27, 2022

(54) PRISM APPARATUS APPLIED TO PERISCOPE LENS MODULE AND PERISCOPE LENS MODULE

(71) Applicant: AAC Optics Solutions Pte. Ltd., Singapore (SG)

(72) Inventors: Linzhen Li, Shenzhen (CN); Jiliang Lu, Shenzhen (CN); Gang Li, Shenzhen (CN); Jin Zhang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 179 days.

(21) Appl. No.: 16/945,921

(22) Filed: Aug. 2, 2020

(65) Prior Publication Data
US 2020/0379244 A1  Dec. 3, 2020

Related U.S. Application Data

(63) Continuation of application No. PCT/CN2019/089731, filed on Jun. 1, 2019.

(51) Int. Cl.
*G02B 23/16* (2006.01)
*G02B 23/08* (2006.01)

(52) U.S. Cl.
CPC ............ *G02B 23/16* (2013.01); *G02B 23/08* (2013.01)

(58) Field of Classification Search
CPC .................................... G02B 3/16; G02B 3/08
See application file for complete search history.

(56) References Cited

U.S. PATENT DOCUMENTS

| | | | |
|---|---|---|---|
| 2018/0239161 A1* | 8/2018 | Seol ...................... | G02B 7/1821 |
| 2018/0321504 A1* | 11/2018 | Hu ........................... | G02B 7/09 |
| 2020/0073140 A1* | 3/2020 | Eddington ........... | G02B 7/1821 |
| 2021/0223567 A1* | 7/2021 | Li ......................... | G02B 27/646 |

FOREIGN PATENT DOCUMENTS

JP         2001027704 A    *  1/2001

* cited by examiner

*Primary Examiner* — William R Alexander
*Assistant Examiner* — Sharrief I Broome
(74) *Attorney, Agent, or Firm* — W&G Law Group

(57) ABSTRACT

Provided are a prism apparatus applied to a periscope lens module and a periscope lens module. The prism apparatus includes a bearing frame, a supporting member, a prism installed, shape memory alloy wires connected between the supporting member and the bearing frame and configured to drive the supporting member to rotate with respect to the bearing frame, and a restoring device connected between the supporting member and the bearing frame and configured to restore the supporting member. In the present invention, the shape memory alloy wires are used to drive the supporting member and the prism, such that the prism can automatically correct the angle, thereby improving the imaging quality. Moreover, the original electromagnetic drive is replaced with the shape memory alloy wires, which reduces a manufacturing cost of the prism apparatus applied to the periscope lens module, thereby achieving a mass production of the periscope lens module.

14 Claims, 9 Drawing Sheets

PRISM APPARATUS APPLIED TO PERISCOPE LENS MODULE AND PERISCOPE LENS MODULE

The present invention relates to the field of optical imaging technology, and more particularly, to a prism apparatus applied to a periscope lens module in mobile electronic devices such as mobile phones.

BACKGROUND

Portable terminals, such as smartphones and tablet computers, are equipped with high-performance lens modules nowadays. The high-performance lens modules generally have an automatic anti-shake function. In the prior art, an electromagnetic drive device is usually employed to exert the automatic anti-shake function. The electromagnetic drive device includes a magnet and a coil, and the coil is energized to control the rotation of the prism to correct an angle of the prism. However, the electromagnetic drive devices are susceptible to interference from external electromagnetic fields, and the used magnets result in an increase in the overall weight and cost of the lens module.

Thus, it is necessary to provide a new lens module for solving the above problems.

SUMMARY

A purpose of the present invention is to provide a prism apparatus applied to a periscope lens module, which has a low cost at adjusting an angle of the prism inside the lens.

Technical solutions of the present disclosure will be described as below.

For achieving the above purpose, the present invention provides a prism apparatus applied to a periscope lens module, including: a bearing frame; a supporting member; a prism installed on the supporting member and configured to receive light; a plurality of shape memory alloy wires connected between the supporting member and the bearing frame and configured to drive the supporting member to rotate with respect to the bearing frame; and a restoring device connected between the supporting member and the bearing frame and configured to restore the supporting member.

As an improvement, the restoring device includes an elastic member.

As an improvement, the bearing frame includes a side plate, and a bottom plate having an end connected to an end of the side plate; the supporting member includes a supporting frame connected to the prism, and a supporting plate spaced apart from the side plate of the bearing frame; wherein the supporting frame includes a connecting portion connected to the supporting plate; and the elastic member is disposed between the connecting portion and the bottom plate of the bearing frame, and the plurality of shape memory alloy wires is connected between the side plate of the bearing frame and the supporting plate.

As an improvement, a plurality of snap joints is provided on the side plate of the bearing frame, a plurality of hooks is provided on a side of the supporting plate facing towards the side plate, both ends of each of the plurality of shape memory alloy wires are respectively fixed to two adjacent snap joints of the plurality of snap joints, and a middle part of each of the plurality of shape memory alloy wires is connected to a corresponding one of the plurality of hooks.

As an improvement, the plurality of memory alloy wires includes four shape memory alloy wires, the plurality of snap joints includes four snap joints, the plurality of hooks includes four hooks, the four snap joints are respectively disposed at four corners of a quadrilateral, and the four hooks are respectively disposed at four sides of another quadrilateral.

As an improvement, the bearing frame further includes two first limiting plates configured to restrict the supporting member from moving out of the bearing frame; the two first limiting plates are connected to the other end of the side plate and the other end of the bottom plate, respectively; the supporting frame further includes an inclined plate, to which the prism is to be mounted, and two second limiting plates respectively connected to two ends of the inclined plate and each provided at an angle with respect to the inclined plate; the connecting portion has one end connected to a middle part of the inclined plate, and the other end penetrating through the elastic member to be engaged with the supporting plate; and the two second limiting plates correspond to the two first limiting plates, respectively.

As an improvement, the elastic member includes a first elastic frame and a second elastic frame; and the connecting portion includes an abutting portion; wherein the first elastic frame includes a first clamping portion, the second elastic frame includes a second clamping portion, and the first clamping portion and the second clamping portion clamp two sides of the abutting portion in such a manner that the supporting member is rotatable around the abutting portion.

As an improvement, a surface of the bottom plate facing towards the elastic member is provided with snap grooves respectively corresponding to the first elastic frame and the second elastic frame, and the first elastic frame and the second elastic frame are respectively fixed in the snap grooves.

The present invention further provides a periscope lens module, including: a shell frame; a lens assembly installed at a middle part of the shell frame; a prism system installed at an end of the shell frame and located at an image side of the lens assembly; and the prism apparatus applied to a periscope lens module as described above. The prism apparatus is installed at the other end of the shell frame and located at an object side of the lens assembly to receive light.

The present invention has the following beneficial effects. In the present invention, the plurality of shape memory alloy wires is used to drive a prism supporting member on the supporting member, such that the prism can automatically correct the angle under the driving of the shape memory alloy wires. The periscope lens module employing such a prism apparatus has a wider imaging angle and better imaging effect. At the same time, the prism apparatus applied to the periscope lens module uses shape memory alloy wires to replace the original electromagnetic drive, which reduces a manufacturing cost of the prism apparatus applied to the periscope lens module, thereby achieving a mass production of the periscope lens module.

Figure 1:
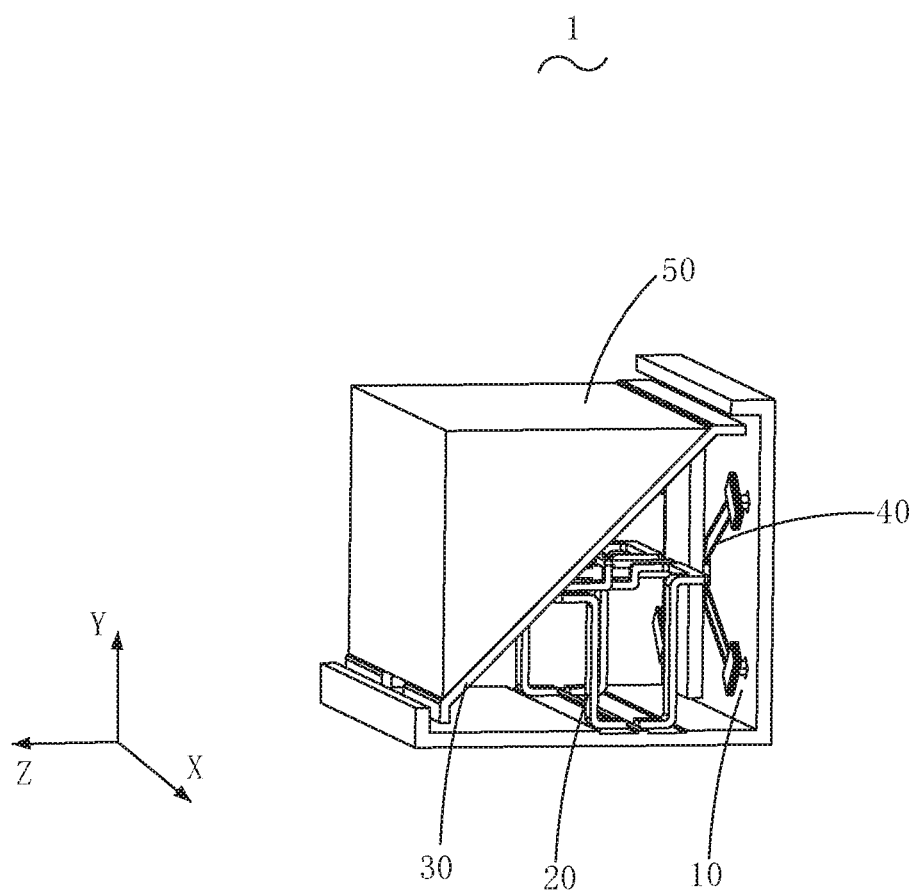
FIG. 1 is a perspective view of a prism apparatus applied to a periscope lens module according to the present invention.

In the drawings, 1: prism apparatus applied to periscope lens module; 10: bearing frame; 11: side plate; 12: bottom plate; 121: snap groove; 13: first limiting plate; 14: snap joint; 20: restoring device; 21: first elastic frame; 211: first clamping portion; 212: first extending portion; 213: first bending portion; 214: second extending portion; 215: first mounting portion; 216: relying portion; 22: second elastic frame; 221: second clamping portion; 222: third extending portion; 223: second bending portion; 224: fourth extending portion; 225: second mounting portion; 23: clamping structure; 30: supporting member; 31: supporting frame; 311: connecting portion; 312: inclined plate; 313: second limiting plate; 314: abutting portion; 32: supporting plate; 321: mounting groove; 322: hook; 40: shape memory alloy wire; 41: first shape memory alloy wire; 42: second shape memory alloy wire; 43: third shape memory alloy wire; 44: fourth shape memory alloy wire; 50: prism; 60: shell frame; 70: lens assembly; 80: prism system.

DESCRIPTION OF EMBODIMENTS

The present invention will be further described with reference to the accompanying drawings and the embodiments.

It should be understood that all the terms describing directions in the embodiments of the present invention, such as "upper", "lower", "inside", "outside", "top", "bottom", etc., are merely intended to explain relative positional relationships of components in a specific posture (as shown in the drawings). The terms will change when the specific posture changes.

It should also be understood that when an element is referred to as being "fixed" or "disposed" on another element, the element may be directly located on another element or there may be an intermediate element therebetween. When an element is referred to as being "connected" to another element, it may be directly connected to the other element or there may be an intermediate element therebetween.

Referring to FIG. 1 to FIG. 8, embodiments of the present invention provide a prism apparatus 1 applied to a periscope lens module. The prism apparatus 1 applied to the periscope lens module includes a bearing frame 10, a restoring device 20, a supporting member 30, a plurality of shape memory alloy wires 40, and a prism 50 installed on the supporting member 30 and configured to receive light. The supporting member 30 is movably installed on the bearing frame 10 via the restoring device 20. The plurality of shape memory alloy wires 40 is connected between the bearing frame 10 and the supporting member 30 and configured to drive the supporting member 30 to rotate around an X-axis direction or a Y-axis direction in the bearing frame 10, such that the prism 50 can be driven by the plurality of shape memory alloy wires 40 to automatically correct its angle. Thus, the periscope lens module applying such a prism apparatus 1 has a wider imaging angle and better imaging effect. The shape memory alloy wires 40 can be instructed by a program to generate a driving force with its memory effect. In the present invention, a width direction of the bearing frame 10 is defined as the X axis direction, a height direction of the bearing frame 10 is defined as the Y axis direction, and a length direction of the bearing frame 10 is defined as a Z axis direction. The X axis direction, the Y axis direction and the Z axis direction are mutually perpendicular.

Figure 2:
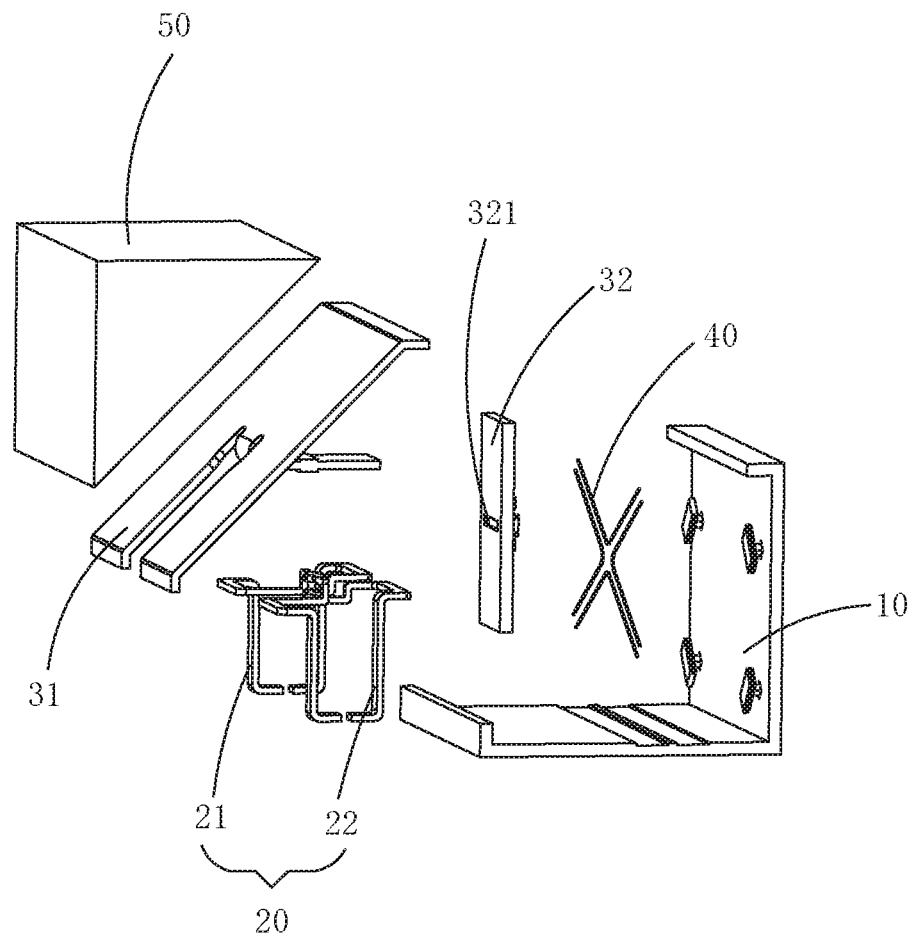
FIG. 2 is an exploded view of FIG. 1.
Figure 3:
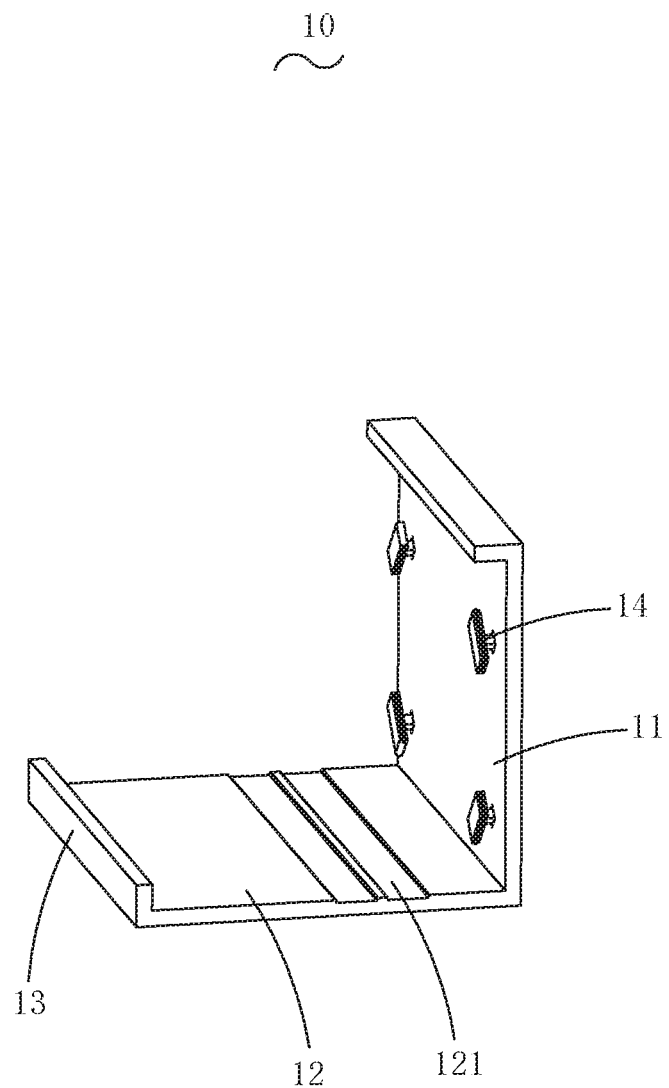
FIG. 3 is a perspective view of a bearing frame of the present invention.

Referring to FIG. 2 and FIG. 3, the bearing frame 10 includes a side plate 11, a bottom plate 12 and two first limiting plates 13. One end of the bottom plate 12 is perpendicular to and connected to one end of the side plate 11, and the two first limiting plates 13 are perpendicular to and connected to the other end of the side plate 11 and the other end of the bottom plate 12, respectively. A plurality of snap joints 14 is provided on a side of the side plate 11 facing towards the supporting member 30. The snap joints 14 and the side plate 11 may be directly formed into one piece, or the snap joints 14 may assembled on the side plate 11 with any existing assembly method. In the present embodiment, by assembling the snap joints 14 on the side plate 11, the structure of the bearing frame 10 can be simplified, and the manufacturing cost of the bearing frame 10 can also be reduced. The supporting member 30 is installed on the snap joints 14 through the plurality of shape memory alloy wires 40, the two first limiting plates 13 are configured to restrict the supporting member 30 from moving out of the bearing frame 10. A snap groove 121 is provided on a surface of the bottom plate 12 corresponding to the restoring device 20 to roughly position the restoring device 20, so as to improve the efficiency and accuracy of assembling the restoring device 20 and the bearing frame 10.

Figure 4:
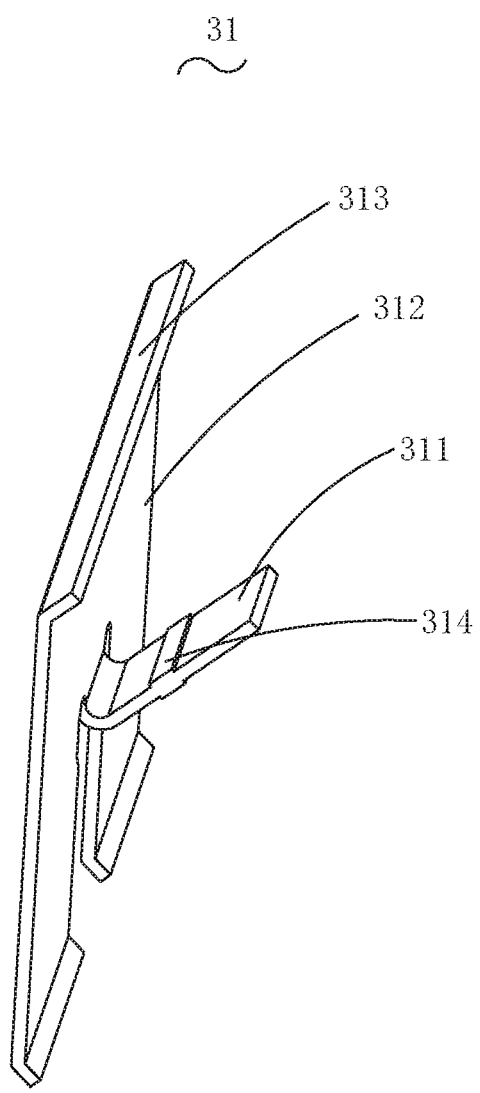
FIG. 4 is a perspective view of a supporting frame of the present invention.

With reference to FIG. 1, FIG. 2 and FIG. 4, the supporting member 30 includes a supporting frame 31 for supporting the prism 50, and a supporting plate 32 spaced apart from the bearing frame 10. In the present embodiment, the supporting plate 32 and the side plate 11 of the bearing frame 10 are arranged in parallel, and the supporting plate 32 is provided with a mounting groove 321 to be engaged with the supporting frame 31. The supporting frame 31 includes a connecting portion 311 connected to supporting plate 32, an inclined plate 312 to which the prism 50 is to be mounted, and second limiting plates 313 respectively connected to both ends of the inclined plate 312 and both provided at an angle with respect to the inclined plate 312. One end of the connecting portion 311 is connected to the middle of the inclined plate 312, and the other end of the connecting portion 311 penetrates through the restoring device 20 and is engaged with the mounting groove 321 on the supporting plate 32. An abutting portion 314 is formed at a position where the connecting portion 311 and the restoring device 20 are connected with each other. In an embodiment, the abutting portion 314 has a greater thickness than other parts of the connecting portion 311 to increase its strength. Specifically, the abutting portion 314 has top and bottom surfaces that are both higher than top and bottom surfaces of other parts of the connecting portion 311. The two second limiting plates 313 correspond to the two first limiting plates 13, respectively, in order to prevent the supporting frame 31 from being thrown out of the bearing frame 10 when the prism apparatus 1 applied to the periscope lens module is falling down.

Figure 5:
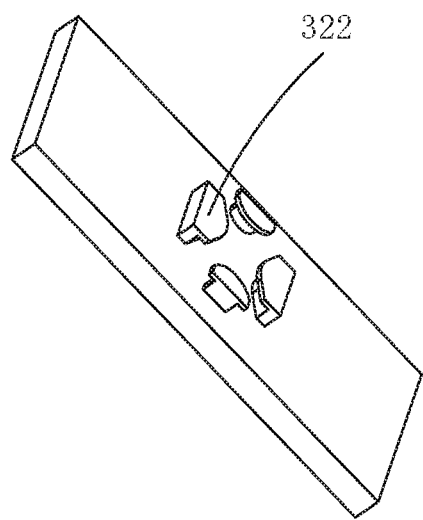
FIG. 5 is a perspective view of a supporting plate of the present invention.

Referring to FIG. 5, as an embodiment, a plurality of hooks 322 is provided on and protrudes from a side of the supporting plate 32 facing towards the side plate 11, and each hook 322 cooperates with each snap joint 14 and fixes a corresponding shape memory alloy wire 40. In the present embodiment, numbers of the shape memory alloy wires 40, the snap joints 14 and the hooks 322 are all four, both ends of each shape memory alloy wire 40 is fixed to two adjacent snap joints 14, and the middle part of each shape memory alloy wire 40 is slidably connected to one hook 322. In this way, each shape memory alloy wire 40 has a V shape, the four hooks 322 are respectively disposed on four sides of quadrangle, and each hook 322 has an L-shaped cross-section, which can prevent the shape memory alloy wires 40 from falling out due to shaking.

Figure 6:
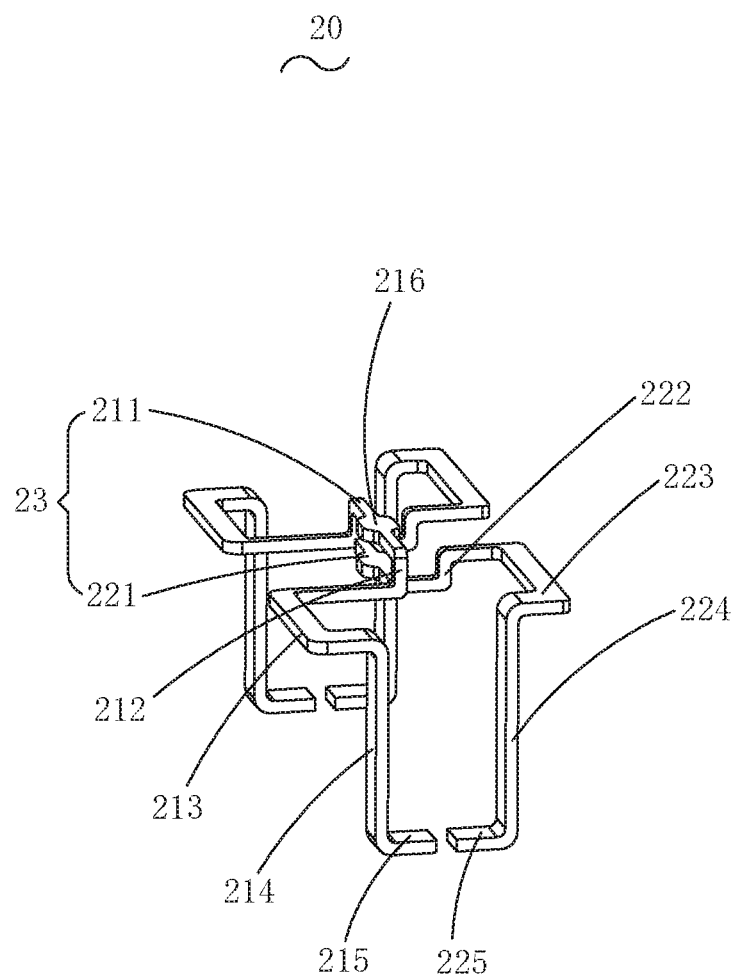
FIG. 6 is a perspective view of a restoring device of the present invention.

Referring to FIG. 2 and FIG. 6, in the present embodiment, the restoring device 20 includes a first elastic frame 21 and a second elastic frame 22. As an example, both the first elastic frame 21 and the second elastic frame 22 are formed by bending a single elastic material. The first elastic frame 21 and the second elastic frame 22 are enclosed to form a clamping structure 23 for fixing the connecting portion 311 of the supporting frame 31.

In an embodiment, the first elastic frame 21 includes a first clamping portion 211, two first extending portions 212 extending from both ends of the first clamping portion 211 while being bent, first bending portions 213 each connected to an end of the first extending portion 212, second extending portions 214 each extending from an end of the first bending portion 213, and first mounting portions 215 each extending from an end of the second extending portion 214 while being bent. As an example, the first bending portion 213 is of a U-shaped structure, and both ends of the U-shaped structure are respectively connected to the first extending portion 212 and the second extending portion 214, the first extending portion 212 and the second extending portion 214 are arranged in parallel, and the first mounting portion 215 is parallel to the bottom plate 12 and snapped in the snap groove 121.

The second elastic frame 22 has a similar structure, including a second clamping portion 221, two third extending portions 222 extending from both ends of the second clamping portion 221 while being bent, second bending portions 223 connected to an end of the third extending portion 222, fourth extending portions 224 each extending from an end of second bending portion 223, and second mounting portions 225 each extending from an end of fourth extending portion 224 while being bent. As an example, the second bending portion 223 is of a U-shaped structure, and both ends of the U-shaped structure are respectively connected to the third extending portion 222 and fourth extending portion 224, the third extending portion 222 and the fourth extending portion 224 are arranged on different planes, the planes where the third extending portion 222 and fourth extending portion 224 are located are perpendicular to a plane where the second bending portion 223 is located, and the second mounting portion 225 is parallel to the bottom plate 12 and is snapped in the snap groove 121. The first clamping portion 211 of the first elastic frame 21 and the second clamping portion 221 of the second elastic frame 22 are respectively clamped on both sides of the abutting portion 314 of the connecting portion 311 and together constitute a clamping structure 23. The first clamping portion 211 and the second clamping portion 221 extend in the same direction as the abutting portion 314. Both the first clamping portion 211 and the second clamping portion 221 are provided with relying portions 216, against which the top and bottom surfaces of abutting portion 314 abut respectively. A width of the relying portions 216 is greater than that of other parts of the first clamping portion 211 and the second clamping portion 221, and is the same as that of the abutting portion 314. The relying portions 216 are provided to improve an assembly accuracy and strength between the supporting frame 31 and the restoring device 20.

Figure 7:
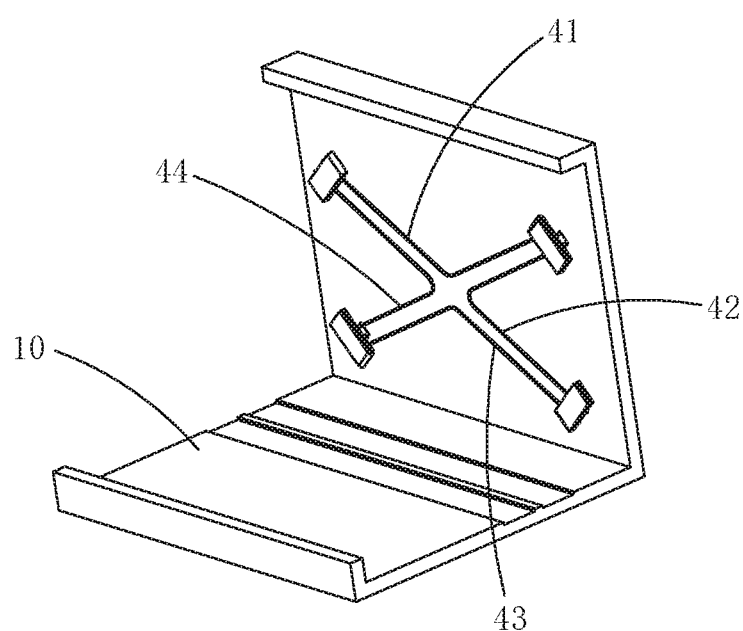
FIG. 7 is a perspective view of a shape memory alloy wire installed on a bearing frame according to the present invention.
Figure 8:
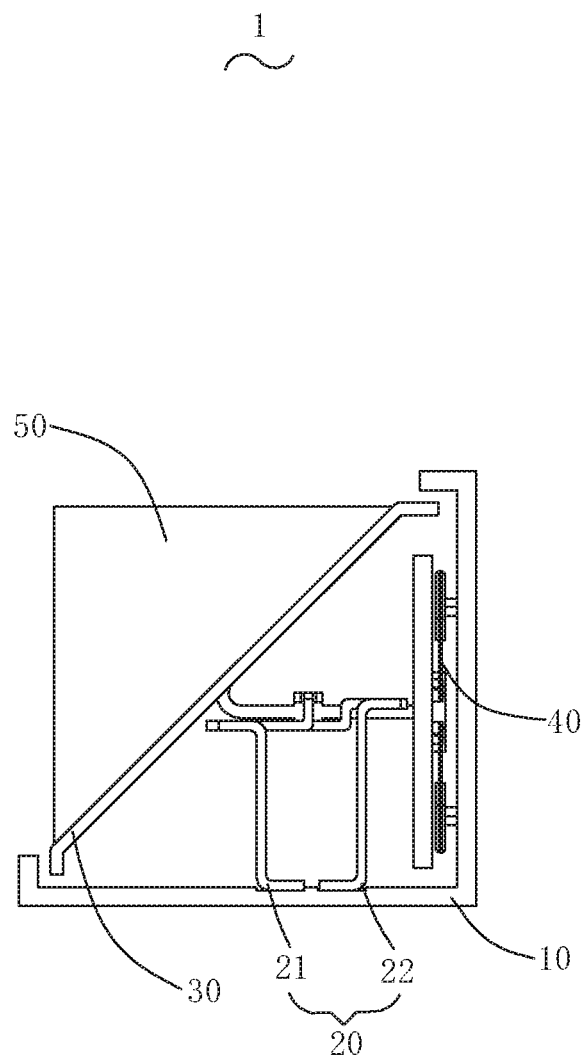
FIG. 8 is a side view of FIG. 1.

With reference to FIG. 2, FIG. 5 and FIG. 7, four shape memory alloy wires 40 are uniformly distributed between the supporting plate 32 and the side plate 11 in the prism apparatus 1 applied to the periscope lens module. As an example, four snap joints 14 are located at four corners of a quadrilateral, and four hooks 322 are located at four sides of another quadrilateral close to the center of the above quadrilateral. In this way, the four shape memory alloy wires 40 can be used to indirectly drive the prism 50 through the supporting member and provide thrust in the Y-axis direction relative to the bearing frame 10, thereby driving the prism 50 to rotate around the X axis; and the four shape memory alloy wires 40 drive the prism 50 and provide thrust in the X axis relative to the bearing frame 10, thereby driving the prism 50 to rotate around the Y axis.

Specifically, the four shape memory alloy wires 40 may be defined as a first shape memory alloy wire 41, a second shape memory alloy wire 42, a third shape memory alloy wire 43, and a fourth shape memory alloy wire 44. The first shape memory alloy wire 41 and the third shape memory alloy wire 43 are respectively arranged on an upper side and a lower side of the side plate 11 along the Y axis direction, the first shape memory alloy wire 41 is located above the third shape memory alloy wire 43, and the second shape memory alloy wire 42 and the fourth shape memory alloy wire 44 are respectively arranged on a left side and a right side of the side plate 11 along the X axis direction. As shown in FIG. 7, the second shape memory alloy wire 42 is located on the right side, and the fourth shape memory alloy wire 44 is located on the left side.

During the actual operation, as shown in FIG. 1, when the first shape memory alloy wire 41 is energized, heated and shrunk, the supporting plate 32 of the supporting member 30 is subjected to an upward pulling force and transmits the force to the connecting portion 311 of the supporting frame 31, such that the supporting frame 31 rotates counterclockwise about the X axis by using the abutting portion 314 of the connecting portion 311 clamped in the clamping structure 23 of the restoring device 20 as a fulcrum. In this way, the prism 50 is driven to rotate counterclockwise about the X axis with respect to the bearing frame 10. When the third shape memory alloy wire 43 is energized and shrunk, the prism 50 rotates clockwise about the X axis with respect to the bearing frame 10. When the second shape memory alloy wire 42 is energized and shrunk, the prism 50 rotates about the Y axis in a direction with respect to the bearing frame 10. When the fourth shape memory alloy wire 44 is energized and shrunk, the prism 50 rotates about the Y axis in the opposite direction with respect to the bearing frame 10. The shape memory alloy wires 40 of the present application may also be referred as an SMA wire, which will not be described in detail herein.

Figure 9:
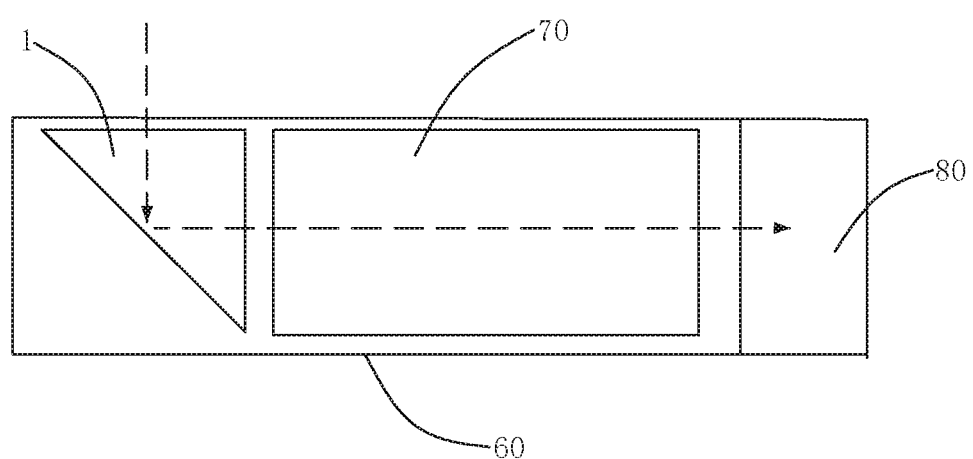
FIG. 9 is a perspective view of a periscope lens module of the present invention.

Referring to FIG. 9, the present invention further provides a periscope lens module. The periscope lens module includes a shell frame 60, a lens assembly 70, a prism system 80, and a prism apparatus 1 applied to the periscope lens module. The lens assembly 70 is installed in the middle of the shell frame 60, the prism system 80 is installed on one end of the shell frame 60 and located at an image side of the lens assembly 70. The prism apparatus 1 applied to periscope lens module is installed on the other end of the shell frame 60 and located at an object side of the lens assembly 70 for receiving light. The light is reflected by the prism apparatus 1 applied to the periscope lens module, propagates along an axis direction of the lens assembly 70, and reaches the prism system 80 to achieve imaging. The light incident along the Y axis direction is reflected by the prism apparatus 1 applied to the periscope lens module and then enters the lens assembly 70 along the Z axis. The light entering the lens assembly 70 along the Z axis is then reflected by the prism system 80 and exits along the X axis direction. The periscope lens module can be used in an electronic device having a camera function. The electronic device having the camera function may be a mobile phone or a camera.

The above are merely several implementations of the present invention. It should be understood that any modifications that may be made by those skilled in the art shall fall within the protection scope of the present invention.

What is claimed is:

1. A prism apparatus applied to a periscope lens module, comprising:
    a bearing frame;
    a supporting member;
    a prism installed on the supporting member and configured to receive light;
    a plurality of shape memory alloy wires connected between the supporting member and the bearing frame and configured to drive the supporting member to rotate with respect to the bearing frame; and
    a restoring device connected between the supporting member and the bearing frame and configured to restore the supporting member;
    wherein the restoring device comprises an elastic member;
    wherein the bearing frame comprises a side plate, and a bottom plate having an end connected to an end of the side plate; the supporting member comprises a supporting frame connected to the prism, and a supporting plate spaced apart from the side plate of the bearing frame; wherein the supporting frame comprises a connecting portion connected to the supporting plate; and the elastic member is disposed between the connecting portion and the bottom plate of the bearing frame, and the plurality of shape memory alloy wires is connected between the side plate of the bearing frame and the supporting plate.

2. The prism apparatus applied to a periscope lens module as described in claim 1, wherein a plurality of snap joints is provided on the side plate of the bearing frame, a plurality of hooks is provided on a side of the supporting plate facing towards the side plate, both ends of each of the plurality of shape memory alloy wires are respectively fixed to two adjacent snap joints of the plurality of snap joints, and a middle part of each of the plurality of shape memory alloy wires is connected to a corresponding one of the plurality of hooks.

3. The prism apparatus applied to a periscope lens module as described in claim 2, wherein the plurality of memory alloy wires comprises four shape memory alloy wires, the plurality of snap joints comprises four snap joints, the plurality of hooks comprises four hooks, the four snap joints are respectively disposed at four corners of a quadrilateral, and the four hooks are respectively disposed at four sides of another quadrilateral.

4. The prism apparatus applied to a periscope lens module as described in claim 2, wherein the bearing frame further comprises two first limiting plates configured to restrict the supporting member from moving out of the bearing frame; the two first limiting plates are connected to the other end of the side plate and the other end of the bottom plate, respectively; the supporting frame further comprises an inclined plate, to which the prism is to be mounted, and two second limiting plates respectively connected to two ends of the inclined plate and each provided at an angle with respect to the inclined plate; the connecting portion has one end connected to a middle part of the inclined plate, and the other end penetrating through the elastic member to be engaged with the supporting plate; and the two second limiting plates correspond to the two first limiting plates, respectively.

5. The prism apparatus applied to a periscope lens module as described in claim 2, wherein the elastic member comprises a first elastic frame and a second elastic frame; and the connecting portion comprises an abutting portion; wherein the first elastic frame comprises a first clamping portion, the second elastic frame comprises a second clamping portion, and the first clamping portion and the second clamping portion clamp two sides of the abutting portion in such a manner that the supporting member is rotatable around the abutting portion.

6. The prism apparatus applied to a periscope lens module as described in claim 5, wherein a surface of the bottom plate facing towards the elastic member is provided with snap grooves respectively corresponding to the first elastic frame and the second elastic frame, and the first elastic frame and the second elastic frame are respectively fixed in the snap grooves.

7. A periscope lens module, comprising:
    a shell frame;
    a lens assembly installed at a middle part of the frame;
    a prism system installed at an end of the shell frame and located at an image side of the lens assembly; and
    a prism apparatus applied to a periscope lens module,
    wherein the prism apparatus comprises:
    a bearing frame;
    a supporting member;
    a prism installed on the supporting member and configured to receive light;
    a plurality of shape memory alloy wires connected between the supporting member and the bearing frame and configured to drive the supporting member to rotate with respect to the bearing frame; and
    a restoring device connected between the supporting member and the bearing frame and configured to restore the supporting member, and
    wherein the prism apparatus is installed at the other end of the shell frame and located at an object side of the lens assembly to receive light.

8. The periscope lens module as described in claim 7, wherein the restoring device comprises an elastic member.

9. The periscope lens module as described in claim 8, wherein the bearing frame comprises a side plate, and a bottom plate having an end connected to an end of the side plate; the supporting member comprises a supporting frame connected to the prism, and a supporting plate spaced apart from the side plate of the bearing frame; wherein the supporting frame comprises a connecting portion connected to the supporting plate; and the elastic member is disposed between the connecting portion and the bottom plate of the bearing frame, and the plurality of shape memory alloy wires is connected between the side plate of the bearing frame and the supporting plate.

10. The periscope lens module as described in claim 9, wherein a plurality of snap joints is provided on the side plate of the bearing frame, a plurality of hooks is provided on a side of the supporting plate facing towards the side plate, both ends of each of the plurality of shape memory alloy wires are respectively fixed to two adjacent snap joints of the plurality of snap joints, and a middle part of each of the plurality of shape memory alloy wires is connected to a corresponding one of the plurality of hooks.

11. The periscope lens module as described in claim 10, wherein the plurality of memory alloy wires comprises four shape memory alloy wires, the plurality of snap joints comprises four snap joints, the plurality of hooks comprises four hooks, the four snap joints are respectively disposed at four corners of a quadrilateral, and the four hooks are respectively disposed at four sides of another quadrilateral.

12. The periscope lens module as described in claim 9, wherein the bearing frame further comprises two first limiting plates configured to restrict the supporting member from moving out of the bearing frame; the two first limiting plates are connected to the other end of the side plate and the other end of the bottom plate, respectively; the supporting frame further comprises an inclined plate, to which the prism is to be mounted, and two second limiting plates respectively connected to two ends of the inclined plate and each provided at an angle with respect to the inclined plate; the connecting portion has one end connected to a middle part of the inclined plate, and the other end penetrating through the elastic member to be engaged with the supporting plate; and the two second limiting plates correspond to the two first limiting plates, respectively.

13. The periscope lens module as described in claim 9, wherein the elastic member comprises a first elastic frame and a second elastic frame; and the connecting portion comprises an abutting portion; wherein the first elastic frame comprises a first clamping portion, the second elastic frame comprises a second clamping portion, and the first clamping portion and the second clamping portion clamp two sides of the abutting portion in such a manner that the supporting member is rotatable around the abutting portion.

14. The periscope lens module as described in claim 13, wherein a surface of the bottom plate facing towards the elastic member is provided with snap grooves respectively corresponding to the first elastic frame and the second elastic frame, and the first elastic frame and the second elastic frame are respectively fixed in the snap grooves.

\* \* \* \* \*